United States Patent [19]
Yamamoto et al.

[11] Patent Number: 6,087,429
[45] Date of Patent: Jul. 11, 2000

[54] PROPYLENE RESIN COMPOSITION

[75] Inventors: Koji Yamamoto; Keiko Shichijo; Hajime Ikeno, all of Yokkaichi, Japan

[73] Assignee: Mitsubishi Chemical Corporation, Tokyo, Japan

[21] Appl. No.: 08/845,208

[22] Filed: Apr. 21, 1997

Related U.S. Application Data

[63] Continuation of application No. 08/344,661, Nov. 22, 1994, abandoned.

[30] Foreign Application Priority Data

Nov. 24, 1993 [JP] Japan .................................. 5-293369
Nov. 24, 1993 [JP] Japan .................................. 5-293370

[51] Int. Cl.$^7$ ........................................................ C08J 3/34
[52] U.S. Cl. ................................................................ 524/451
[58] Field of Search .............................................. 524/451

[56] References Cited

U.S. PATENT DOCUMENTS

| | | | |
|---|---|---|---|
| 5,278,272 | 1/1994 | Lai et al. ............................. | 526/348.5 |
| 5,308,908 | 5/1994 | Fukui et al. ......................... | 524/451 |
| 5,374,677 | 12/1994 | Nishiio et al. ....................... | 524/451 |
| 5,391,618 | 2/1995 | Yamamoto et al. .................. | 525/240 |

*Primary Examiner*—Peter D. Mulcahy
*Attorney, Agent, or Firm*—Oblon, Spivak, McClelland, Maier & Neustadt, P.C.

[57] ABSTRACT

The present invention provides a propylene resin composition having an excellent balance between low-temperature impact resistance and rigidity, and which is suitable for automobile interior and exterior trim parts.

The resin composition contains the following components A, B, and C:

Component A: 50 to 80% by weight of a crystalline propylene-ethylene block copolymer having an ethylene content of 1 to 15% by weight, and a melt flow rate of 10 to 100 g/10 min.

Component B: 5 to 40% by weight of an ethylene-α-olefin copolymer containing 25 to 70% by weight of an α-olefin having 4 to 18 carbon atoms, a melt flow rate of 0.01 to 7 g/10 min., and a density of 0.850 to 0.890 g/cm$^3$ Component C: 1 to 30% by weight of talc having an average particle size of 0.1 to 5μ.

4 Claims, No Drawings

PROPYLENE RESIN COMPOSITION

This application is a Continuation of application Ser. No. 08/344,661, filed on Nov. 22, 1994, now abandoned.

BACKGROUND OF THE INVENTION

1. Field of the Invention

The present invention relates to a specified resin composition which comprises a crystalline propylene-ethylene block copolymer, an ethylene-α-olefin copolymer and talc, which has an excellent balance between low-temperature impact resistance and rigidity, and which is suitable for producing injection molded products such as automobile interior and exterior trim parts, e.g., instrument panels, bumpers, etc.

2. Description of the Related Art

Although crystalline polypropylene has excellent characteristics such as rigidity, heat resistance and gloss, it has the drawback that it cannot be used for applications which simultaneously require good rigidity, heat resistance, impact resistance and coating properties because it exhibits poor impact resistance and coating properties. Particularly, since crystalline polypropylene has poor impact resistance at low temperatures, the application thereof to automobile exterior trim parts such as bumpers is limited. A method for overcoming such drawbacks is proposed in which a rubber component such as an amorphous ethylene-propylene copolymer is mixed with the crystalline polypropylene. A method of adding and mixing an inorganic filler such as talc or the like is also proposed for preventing loss of rigidity by the addition of such rubber substances.

For example, Japanese Patent Publication No. 60-3420 discloses a polypropylene composition for automobile bumpers, which contains 55 to 65% by weight of crystalline propylene-ethylene block copolymer having an ethylene content of 5 to 10% by weight, at least 97% by weight of the component of polypropylene insoluble to boiling n-heptane, an intrinsic viscosity (decalin at 135° C.) of room temperature para-xylene soluble matter of 3 to 4 and a melt flow index of 2 to 10; 30 to 35% by weight of amorphous ethylene-propylene copolymer having an intrinsic viscosity (decalin at 135° C.) of 2.0 to 3.5 and a Mooney viscosity $ML_{1+4}$ (100° C.) of 40 to 100; and 5 to 15% by weight of talc having an average particle size of 0.5 to 5μ.

Japanese Patent Publication Nos. 63-42929 and 4-28749 disclose polypropylene compositions which contain an ethylene-α-olefin copolymer as a material for improving impact strength in place of an amorphous ethylene-propylene copolymer, but this composition does not always have a satisfactory balance between low-temperature impact resistance and rigidity.

Japanese Patent Laid-Open No. 4-159345 discloses a polypropylene composition in which the melt flow rate is 4 to 50 g/10 min., the density is 0.910 g/cm³ or less, the highest melting peak temperature measured by a differential scanning calorimeter (DSC) is at least 100° C., and the highest melting peak temperature again as measured by DSC of an ethylene-α-olefin copolymer having melting heat of at least 10 joule/g at at least 100° C. is as high as 100° C. or more. Thus the polypropylene composition does not always have satisfactory impact resistance.

SUMMARY OF THE INVENTION

An object of the present invention is to provide a resin composition which has an excellent balance between low-temperature impact resistance and rigidity, and which is suitable for injection molded products, as well as to provide automobile parts produced by injection molding the resin composition, specifically, automobile interior and exterior trim parts such as instrument panels, bumpers, etc.

As a result of various examinations for obtaining a resin composition having an excellent balance between low-temperature impact resistance and rigidity in consideration of the above situation, the inventors found that the object of the present invention can be achieved by a resin composition comprising a specified crystalline propylene-ethylene block copolymer, and an ethylene-α-olefin copolymer and an inorganic filler. The present invention has been achieved on the basis of this finding.

In order to achieve the object, the present invention provides a propylene resin composition containing the following components A, B and C:

Component A: 50 to 80% by weight of a crystalline propylene-ethylene block copolymer having an ethylene content of 1 to 15% by weight, and a melt flow rate of 10 to 100 g/10 min.

Component B: 5 to 40% by weight of an ethylene-α-olefin copolymer containing 25 to 70% by weight of α-olefin having 4 to 18 carbon atoms, a melt flow rate of 0.01 to 7 g/10 min., and a density of 0.850 to 0.890 g/cm³.

Component C: 1 to 30% by weight of talc having an average particle size of 0.1 to 5μ.

DETAILED DESCRIPTION OF THE INVENTION

1. Composition Component

Component A

The crystalline propylene-ethylene block copolymer used in the present invention has an ethylene content of 1 to 15% by weight, preferably 2 to 10% by weight, and a melt flow rate of 10 to 100 g/10 min., preferably 20 to 90 g/10 min. With a melt flow rate of less than 10 g/10 min., moldability deteriorates, and with a melt flow rate of over 100 g/10 min., impact resistance deteriorates.

The propylene polymer as component A is characterized also by its crystalline structure such that the weight ratio of the crystalline phase (I) to the intermediate phase (II) is 1.5 to 4, preferably 2 to 3.5, and the content of the amorphous phase (III) is 3 to 30% by weight, preferably 5 to 20% by weight, where these phases are determined by Multiple-Pulse NMR Techniques, which are described in "K. Fujimoto, T. Nishi and R. Kado: Polym. J. Vol. 3, 448–462 (1972)".

When the ratio (I)/(II) is smaller than the level of the above range, the propylene polymer would have undesirably low thermal resistance, and when the ratio is larger than the level of the above range, the propylene polymer would have undesirably low tensile elongation properties. When the content of phase (III) is higher than the level of the above range, the propylene polymer would produce molded/formed articles which are undesirably susceptible to marring on the surface.

Copolymer component A is produced by using a high-stereoregularity catalyst. Typical examples of the known methods of producing the catalyst include a method in which a titanium trichloride composition obtained by reducing titanium tetrachloride with an organic aluminum compound, and then treating the product with any one of various electron donors and electron acceptors is combined with an organic aluminum compound and an aromatic carboxylate (Japanese Patent Laid-Open Nos. 56-100806, 56-120712 and 58-104907); and a method for a carrier type catalyst in which magnesium halide is brought into contact with titanium tetrachloride and any one of various electron donors (Japanese Patent laid-Open Nos. 57-63310, 63-43915 and 63-83116).

The resultant polymer is a so-called non-polymer-blend type copolymer. Copolymer component A may be a mixture of at least two propylene-ethylene block copolymers which are separately polymerized.

The propylene-ethylene block copolymer used as component A according to the present invention is preferably a block copolymer comprising a propylene homopolymer block and a propylene-ethylene copolymer block which may be prepared by homopolymerizing propylene and then continuing the polymerization for a mixture of propylene with ethylene, which block copolymer may alternatively be called "a chemical blend of a propylene homopolymer and a propylene-ethylene random copolymer". The reason for this is that such a block copolymer can balance the properties of a final composition to a higher degree, thereby ensuring more ready attainment of the object of the present invention.

Component B

Copolymer component B used in the present invention and comprising ethylene and α-olefin having 4 to 18 carbon atoms has the α-olefin content of 25 to 70% by weight, preferably 30 to 65% by weight, a density of 0.850 to 0.890 g/cm$^3$, preferably 0.855 to 0.880 g/cm$^3$, and a melt flow rate of 0.01 to 7 g/10 min., preferably 0.1 to 5 g/10 min.

With the α-olefin content of less than 25% by weight, there is little effect in improved impact resistance, and with the α-olefin content over 70% by weight, melt flow properties and moldability deteriorate. Also, with a melt flow rate of less than 0.01 g/10 min., the melt flow properties deteriorate, and with a melt flow rate of over 7 g/10 min., the effect of improved impact resistance is poor.

In the ethylene-α-olefin copolymer, the average length of methylene sequences (ALMS) having a carbon number of at least 5, which is determined by $^{13}$C-NMR, is preferably 7 to 23, more preferably 9 to 18. With the average length of less than 7, the copolymer becomes very sticky, and with an average length of over 23, the copolymer becomes brittle.

The average Length of Methylene Sequence having a carbon number of not less than 5 (thereafter abbreviated to "ALMS") represents the ratio Ct/Bn, wherein Bn means the number of blocks comprising methylene sequences having a carbon number of at least 5 and Ct means the total number of carbons which form the block.

The α-olefin may be α-olefins of $C_4$ to $C_{18}$, preferably $C_6$ to $C_{18}$, more preferably $C_6$ to $C_{10}$. Examples of such α-olefins include 1-butene, 1-pentene, 1-hexene, 1-heptene, 1-octene, 4-methyl-1-pentene, 4-methyl-1-hexene, 4,4-dimethyl-1-pentene and the like.

Copolymer component B may contain a small amount of diene component such as dicyclopentadiene, ethylidenenorbornene, 1,4-hexadiene, 1,9-decadiene, vinylnorbornene or the like, which may be copolymerized therewith.

Examples of the catalyst which can be used for producing the ethylene-α-olefin copolymer include a so-called Ziegler catalyst comprising a combination of a titanium compound such as a titanium halide and/or a vanadium compound, and an organic aluminum-magnesium complex such as an alkylaluminum-magnesium complex, an alkylalkoxyaluminum-magnesium complex or the like, and an organic compound of a metal of Group I to III in the Periodic Table, such as alkyl aluminum or an alkylaluminum chloride; or a metallocene catalyst as disclosed in Publication No. WO-91/04257. However, the metallocene catalyst is preferred for use in the present invention to maintain the specified density range and decrease the content of low-molecular sticky components.

Copolymer component B is obtained by using as a polymerization method for copolymerizing ethylene and α-olefin a production process such as a vapor phase fluidized bed process, a solution process, a slurry process or a high-pressure ion polymerization process at a pressure of 200 kg/cm$^2$ and a temperature of 180° C. or more. However, for obtaining a density and MFR within the ranges specified in the present invention it is preferable to produce component B by the high-pressure ion polymerization process.

Component C

Talc component C used in the present invention is generally commercially available as an inorganic filler, and has an average particle size of 0.1 to 5μ, preferably 0.3 to 4μ. With the average particle size of over 5μ, the mechanical strength is sometimes decreased, while with the average particle size of less than 0.1μ, poor dispersion sometimes occurs in kneading. Talc component C may be untreated, or in order to improve its affinity with the crystalline propylene-ethylene block copolymer (Component A) a talk which is treated with an organic titanate silane coupling agent, a silane coupling agent or a carboxylic acid-modified polyolefin or combination thereof.

2. Propylene Resin Composition (1) Compounding ratio of each component

The compounding ratios of crystalline propylene-ethylene block copolymer as component A, ethylene-α-olefin copolymer as component B and talc as component C, which form the composition of the present invention, are 50 to 80% by weight, preferably 60 to 75% by weight, 5 to 40% by weight, and 1 to 30% by weight, respectively.

If component A is less than 50% by weight, rigidity deteriorates, while if more than 80% by weight, impact resistance deteriorates. If component B is less than 5% by weight, the effect of improving impact strength is poor, while if more than 40% by weight, rigidity deteriorates. If component C is less than 1% by weight, the effect of improving rigidity deteriorates, while if more than 30% by weight, impact resistance deteriorates due to embrittlement.

The resin composition of the present invention is widely used for automobile injection molded products, and thus the compounding ratios of components B and C can appropriately be changed within the above ranges in order to attempt to optimize the balance between impact resistance and rigidity in accordance with the necessary performance of the molded products.

For example, on a molded product such as an automobile bumper in which low-temperature impact resistance is regarded as more important than rigidity, the compounding ratios of component B and C are preferably 25 to 35% by weight, and 5 to 15% by weight, respectively. On a molded product such as an automobile instrument panel in which low-temperature rigidity is regarded as more important than impact resistance, the compounding ratios of component B and C are preferably 7 to 15% by weight, and 15 to 25% by weight, respectively.

(2) Preparation of Composition

The resin composition of the present invention which contains the components uniformly dispersed, and which is suitable for high-quality automobile interior and exterior trim parts and the like can be obtained by the method comprising mixing crystalline propylene-ethylene block copolymer component A, ethylene-α-olefin copolymer component B, and talc component C within the above ranges by using, for example, a Henschel mixer, a V-blender, a ribbon blender, a tumbler blender or the like, and then kneading the resultant mixture by using a kneading machine such as a single shaft extruder, a multi-shaft extruder, a kneader, a banbury mixer or the like.

The composition of the present invention may contain various additives such as another resin, for example styrene-butadiene rubber, isoprene rubber or the like; antioxidants, ultraviolet absorbesr, lubricants, nucleating agents, antistatic agents, flame retardants, pigments, dyes, inorganic or organic fillers other than the talc used as component C in the present invention, and reinforcing agents, etc. within a range which does not cause the object of the present invention to be lost.

Since the resin composition containing an inorganic filler according to the present invention has an excellent balance between low-temperature impact resistance and rigidity and is suitable for injection molding, it is suitable for producing automobile instrument panels, automobile bumpers, air dam spoilers, etc.

EXAMPLES

The evaluation methods used in the examples below were as follows:

(Melt flow rate)

Measured by using a molded product specimen in accordance with JIS K7210.

(Density)

Measured by using a molded product specimen in accordance with JIS K7112.

(Flexural properties)

Measured by using a molded product specimen at a room temperature of 23C in accordance with JIS K7203.

(Izod impact test-with cut notch)

Measured by using a molded product specimen at −30° C. or −40° C. in accordance with JIS K7110.

(α-olefin content)

Measured in accordance with the $^{13}$C-NMR measurement method disclosed in "Macromolecules (1982), 15, pp 353–360 and pp 1402–1406".

Apparatus: JEOL-GSX270
Solvent: o-dichlorobenzene (70)/ds-benzene (30)
Measurement concentration: 10 (wt/v) %
Temperature: 130° C.
Spectral range: 11000 Hz
Data point: 16 μs (60)
Pulse repetition: 4 s
Scans: 3000

(Multiple-Pulse NMR)

Multiple-Pulse NMR was measured by a JEOL-GSX 270 apparatus (Nippon Denshi, Japan) on a sample at 30° C. so that a solid echo was determined at 90°, pulse width 1.8 μs. The data obtained showing a magnetization decrease curve was logarithmically plotted and analyzed by the method described in of "K. Fujita, T. Nishi and R. Kado: Polym. J. Vol. 3, 438–462 (1972)" for separation of components whereby % contents of the components were determined.

(Average length of methylene sequences having a carbon number of at least 5)

The average number of methylene sequences having a carbon number of at least 5 was calculated by using the integrals of $^{13}$C-NMR signals. Specifically, the $^{13}$C-NMR signals measured on the ethylene-propylene copolymers, ethylene-butene copolymers and ethylene-hexene copolymers were respectively assigned to methylene sequences on the basis of the Lindeman-Adams empirical equations which indicate head-head and head-tail bonds of comonomers in accordance with "Macromolecules (1991) 24, p4813", "Macromolecules (1977) 10, p536"and "Poly. Bull. (1991) 26, p325".

The average length of methylene sequences was calculated by using the integrals of $^{13}$C-NMR signals in accordance with "Bulletin of the Rubber Society of Japan, No. 60, Vol. 1 p38 (1987)".

The specific method is as follows:

The average length of methylene sequences ni+ indicates the average length of methylene sequences having a length of i or more, and is calculated by the equation (1) below.

$$ni_{+} = \frac{k[CH_2] - \sum_{j=0}^{1-i} jS_j}{\sum_{j=1}^{5} S_j + S_{6+}} \quad (1)$$

wherein Sj is the integral of the $^{13}$C-NMR signal indicating the number of methylene sequences having a length of j, and is calculated by the following equations (2) to (7):

$$S_1 = K[01\underline{0}10] + k[11\underline{0}10] \quad (2)$$

$$S_2 = \{K[01\underline{0}01] + k[11\underline{0}01]\}/2 \quad (3)$$

$$S_3 = K[10\underline{0}01] \quad (4)$$

$$S_4 = K[?10\underline{0}001]/2 \ (?=0 \text{ or } 1) \quad (5)$$

$$S_5 = K[100\underline{0}001] \quad (6)$$

$$S_6 = K[100\underline{0}000]/2 \quad (7)$$

[ ] on the right indicates the concentration of the sequence shown therein where 1 indicates a methine carbon, 0 indicates a methylene carbon, an underline indicates a center carbon of a sequence, and k indicates a coefficient for converting into $^{13}$C-NMR integrals. Each of the integrals on the right side can be calculated by the equations below in accordance with the type of α-olefin of the ethylene/α-olefin copolymers.

k[CH$_2$] is the total integral of methylene signals, and can be calculated by the equations below.

In the equations below, a T with a subscript on the right is the integral of each of the signals below.

Where an α-olefin is propylene, $$k[CH_2]=T_A+T_C+T_D+T_{F3}+T_{F4}+T_{F5}+T_H+T_I$$

$$k[01\underline{0}10]=T_A$$

$$k[11\underline{0}10]=absent$$

$$k[01\underline{0}01]=T_D$$

$$k[11\underline{0}01]=absent$$

$$k[10\underline{0}01]=T_I$$

$$k[?10\underline{0}001]=T_{H2}$$

$$k[100\underline{0}001]=T_{F3}$$

$$k[100\underline{0}000]=T_{F4}$$

$T_A$: integral of a signal at 45.5 to 48.0 ppm
$T_C$: integral of a signal at 37.2 to 39.2 ppm
$T_D$: integral of a signal at 34.6 to 36.2 ppm
$T_{F3}$: integral of a signal at 30.8 ppm
$T_{F4}$: integral of a signal at 30.4 ppm
$T_{F5}$: integral of a signal at 30.0 ppm
$T_H$: integral of a signal at 27.2 to 28.2 ppm
$T_{H2}$: integral of a signal at 28.0 ppm
$T_I$: integral of a signal at 24.6 to 25.2 ppm
Where an a-olefin is butene, $$k[CH_2]=-T_{A1}+T_B+T_C+T_D+T_E$$

$$k[01\underline{0}10]=T_{A2}/2+2T_{A1}-T_B$$

$$k[11\underline{0}10]=absent$$

$$k[01\underline{0}01]=T_{B2}$$

$$k[11\underline{0}01]=absent$$

$$k[10\underline{0}01]=T_E$$

$$k[?10\underline{0}001]=T_{D1}$$

$$k[100\underline{0}001]=T_{C1}$$

$$k[100\underline{0}000]=T_{C2}$$

$T_{A1}$: integral of a signal at 38.9 to 41.0 ppm
$T_{A2}$: integral of a signal at 37.0 to 38.0 ppm
$T_{B1}$: integral of a signal at 33.8 to 35.2 ppm
$T_{B2}$: integral of a signal at 31.1 to 31.8 ppm
$T_{C1}$: integral of a signal at 31.0 ppm
$T_{C2}$: integral of a signal at 30.5 ppm
$T_{C3}$: integral of a signal at 30.0 ppm
$T_{D1}$: integral of a signal at 27.8 ppm
$T_{D2}$: integral of a signal at 26.4 to 27.7 ppm
$T_E$: integral of a signal at 24.3 to 25.0 ppm
Where an α-olefin is hexene, $$k[CH_2]=T_A+T_{D1}+T_{D2}+T_{D3}+T_{D4}+2T_E+3T_F$$

$$k[01\underline{0}10]=T_A$$

$$k[11\underline{0}10]=absent$$

$$k[01\underline{0}01]=T_{D1}$$

$$k[11\underline{0}01]=absent$$

$$k[10\underline{0}01]=T_F$$

$$k[?10\underline{0}001]=T_{E1}$$

$$k[100\underline{0}001]=T_{D2}$$

$$k[100\underline{0}000]=T_{D3}$$

$T_A$: integral of a signal at 4.00 to 42.0 ppm
$T_{D1}$: integral of a signal at 31.2 to 32.4 ppm
$T_{D2}$: integral of a signal at 31.0 ppm
$T_{D3}$: integral of a signal at 30.5 ppm
$T_{D4}$: integral of a signal at 30.0 ppm
$T_E$: integral of a signal at 26.8 to 28.0 ppm
$T_{E1}$: integral of a signal at 27.8 ppm
$T_F$: integral of a signal at 24.0 to 24.8 ppm Example 1

Production of Component B1

A catalyst was prepared by the method disclosed in Publication No. WO-91/04257.

Methylalumoxane and the complex, Me$_2$Si(C$_5$Me$_4$H) (NC$_{12}$H$_{23}$) TiCl$_2$, were dissolved in toluene to prepare a catalyst solution. Polymerization was effected by the following method:

Ethylene and 1-hexene were supplied to a 1.5-l agitation type autoclave continuous reactor so that the composition ratio thereof was 62%. Reaction was effected at 180° C. while the pressure in the reactor was maintained at 1300 kg/cm$^2$. After reaction, a copolymer (component B1) having an MFR of 0.7 g/10 min., a density of 0.873 g/cm$^3$, and a 1-hexene content of 33% by weight was obtained.

Preparation of composition (1)

65% by weight of crystalline propylene-ethylene block copolymer (component A) having an MFR of 30 g/10 min., and an ethylene content of 10% by weight; 15% by weight of the copolymer (component B) obtained by the above method; and 20% by weight of talc (component C) having an average particle size of 3.8μ were mixed for 5 minutes by a supermixer produced by Kawada Seisakusho, and then kneaded and granulated at 210° C. by an FCM twin screw kneader produced by Kobe Seikosho to obtain a composition. Each of specimens was then formed at a molding temperature of 220° C. by an injection molding machine under a clamping pressure of 100 tons and used for evaluating performance by the above methods of measurement. The results obtained are shown in Table 1.

Examples 2 to 5

65% by weight of the same crystalline propylene-ethylene block copolymer (component A) as that used in Example 1, 20% by weight of talc and 15% by weight of each of the copolymers (component B) shown in Table 1 obtained by slightly changing the polymerization conditions for the ethylene-α-olefin copolymer used in Example 1 were mixed, molded, and then evaluated by the same method as that employed in Example 1. The results obtained are shown in Table 1.

Example 6

60% by weight of the same crystalline propylene-ethylene block copolymer (component A) as that used in Example 1, 25% by weight of talc and 15% by weight of each of the copolymers (component B) shown in Table 1 obtained by slightly changing the polymerization conditions for the ethylene-α-olefin copolymer used in Example 1 were mixed, molded, and then evaluated by the same method as that employed in Example 1. The results obtained are shown in Table 1.

Comparative Example 1

80% by weight of the same crystalline propylene-ethylene block copolymer as that used in Example 1, and 20% by weight of talc were mixed, molded, and then evaluated by the same method as that employed in Example 1. The results obtained are shown in Table 2.

Comparative Example 2

65% by weight of the same crystalline propylene-ethylene block copolymer as that used in Example 1, 20% by weight of talc, and 15% by weight of the copolymer obtained by slightly changing the polymerization conditions for the ethylene-α-olefin copolymer used in Example 1 and having an MFR of 1.0 g/10 min., a density of 0.910 g/cm$^2$ and a 1-hexene content of 12% by weight were mixed, molded, and then evaluated by the same method as that employed in Example 1. The results obtained are shown in Table 2.

Comparative Example 3

65% by weight of the same crystalline propylene-ethylene block copolymer as that used in Example 1, 20% by weight of talc, and 15% by weight of the copolymer obtained by slightly changing the polymerization conditions for the ethylene-α-olefin copolymer used in Example 1 and having an MFR of 2.0 g/10 min., a density of 0.895 g/cm$^2$ and a 1-hexene content of 20% by weight were mixed, molded, and then evaluated by the same method as that employed in Example 1. The results shown in Table 2.

Comparative Example 4

65% by weight of the same crystalline propylene-ethylene block copolymer as that used in Example 1, 20% by weight of talc, and 15% by weight of the ethylene-propylene copolymer produced by using a vanadium catalyst were mixed, molded and then evaluated by the same method as that employed in Example 1. The results obtained are shown in Table 2.

Comparative Example 5

65% by weight of crystalline propylene-ethylene block copolymer having an MFR of 200 g/10 min. and an ethylene content of 10%, 15% by weight of the same ethylene-α-olefin copolymer as that used in Example 5, and 20% by weight of talc were mixed, molded and then evaluated by the same method as that employed in Example 1. The results obtained are shown in Table 2.

TABLE 1

|  | Unit | Example 1 | Example 2 | Example 3 | Example 4 | Example 5 | Example 6 |
|---|---|---|---|---|---|---|---|
| Component A | | | | | | | |
| MFR (230° C.) | g/10 min | 30 | 30 | 30 | 30 | 30 | 36 |
| Ethylene unit content | wt % | 10 | 10 | 10 | 10 | 10 | 10 |
| Multiple-Pulse NMR | | | | | | | |
| Crystalline phase (I) | wt % | 66 | 66 | 66 | 66 | 66 | 66 |
| Intermediate phase (II) | wt % | 26 | 26 | 26 | 26 | 26 | 26 |
| Amorphous phase (III) | wt % | 8 | 8 | 8 | 8 | 8 | 8 |
| (I)/(II) | — | 2.5 | 2.5 | 2.5 | 2.5 | 2.5 | 2.5 |
| Amount | wt % | 65 | 65 | 65 | 65 | 65 | 60 |
| Component B | | | | | | | |
| MFR (190° C.) | g/10 min | 0.7 | 1.0 | 1.1 | 2.0 | 4.5 | 0.7 |
| Density | g/cm$^3$ | 0.873 | 0.863 | 0.861 | 0.889 | 0.861 | 0.873 |
| α-olefin content | wt % | 33 | 38 | 41 | 25 | 41 | 33 |
| Kind of comonomer | | 1-hexene | 1-hexene | 1-hexene | 1-hexene | 1-hexene | 1-hexene |
| Average length of methylene sequence | | 15.2 | 11.2 | 10.4 | 22.8 | 10.4 | 15.2 |
| Kind of catalyst | | M | M | M | M | M | M |
| Amount | wt % | 15 | 15 | 15 | 15 | 15 | 15 |
| Component C | | | | | | | |
| Mean particle size | μm | 3.8 | 3.8 | 3.8 | 3.8 | 3.8 | 3.8 |
| Amount | wt % | 20 | 20 | 20 | 20 | 20 | 25 |
| Properties of molded piece | | | | | | | |
| Modulus in flexure (at 23° C.) | kg/cm$^2$ | 25500 | 25100 | 24600 | 25600 | 24600 | 28200 |

TABLE 1-continued

|  | Unit | Example | | | | | |
|---|---|---|---|---|---|---|---|
|  |  | 1 | 2 | 3 | 4 | 5 | 6 |
| Izod impact strength (at −30° C.) | kg–cm/cm² | 4.8 | 5.3 | 5.5 | 4.2 | 5.0 | 3.2 |

Component A: Crystalline propylene-ethylene block copolymer
Component B: Ethylene-α-olefin copolymer
Component C: Talc
M: Metallocene catalyst
V: Vanadium catalyst

TABLE 2

|  | Unit | Comparative Example | | | | |
|---|---|---|---|---|---|---|
|  |  | 1 | 2 | 3 | 4 | 5 |
| Component A |  |  |  |  |  |  |
| MFR (230° C.) | g/10 min | 30 | 30 | 30 | 30 | 200 |
| Ethylene unit content | wt % | 10 | 10 | 10 | 10 | 10 |
| Multiple-Pulse NMR |  |  |  |  |  |  |
| Crystalline phase (I) | wt % | 66 |  |  |  |  |
| Intermediate phase (II) | wt % | 26 |  |  |  |  |
| Amorphous phase (III) | wt % | 8 |  |  |  |  |
| (I)/(II) | — | 2.5 |  |  |  |  |
| Amount | wt % | 80 | 65 | 65 | 65 | 65 |
| Component B |  |  |  |  |  |  |
| MFR (190° C.) | g/10 min | — | 1.0 | 2.0 | 0.3 | 1.1 |
| Density | g/cm³ | — | 0.910 | 0.895 | 0.860 | 0.861 |
| α-olefin content | wt % | — | 12 | 20 | 27 | 41 |
| Kind of comonomer |  | — | 1-hexene | 1-hexene | propylene | 1-hexene |
| Average length of methylene sequence |  | — | 34.8 | 25.5 | 11.4 | 10.4 |
| Kind of catalyst |  | — | M | M | V | M |
| Amount | wt % | — | 15 | 15 | 15 | 15 |
| Component C |  |  |  |  |  |  |
| Mean particle size | μm | 3.8 | 3.8 | 3.8 | 3.8 | 3.8 |
| Amount | wt % | 2.0 | 20 | 20 | 20 | 20 |
| Properties of molded piece |  |  |  |  |  |  |
| Modulus in flexure (at 23° C.) | kg/cm² | 39500 | 25800 | 25700 | 25500 | 24000 |
| Izod impact strength (at −30° C.) | kg–cm/cm² | 2.0 | 2.5 | 3.5 | 4.4 | 3.6 |

Component A: Crystalline propylene-ethylene block copolymer
Component B: Ethylene-α-olefin copolymer
Component C: Talc
M: Metallocene catalyst
V: Vanadium catalyst Example 7
Production of component B2

A catalyst was prepared by the method disclosed in Publication No. WO-91/04257.

Methylalumoxane and the complex, $Me_2Si(C_5Me_4H)(NC_{12}H_{23}) TiCl_2$, were dissolved in toluene to prepare a catalyst solution. Polymerization was effected by the following method:

Ethylene and 1-hexene were supplied to a 1.5-l agitation type autoclave continuous reactor so that the composition ratio thereof was 73%. Reaction was effected at 180° C. while the pressure in the reactor was maintained at 1000 kg/cm². After reaction, a copolymer (component B2) having an MFR of 1.4 g/10 min., a density of 0.856 g/cm³, and a 1-hexene content of 52% by weight was obtained.

Preparation of composition (2)

60% by weight of crystalline propylene-ethylene block copolymer (component A) having an MFR of 30 g/10 min., and an ethylene content of 10% by weight; 30% by weight of the copolymer (component B) obtained by the above method, and 10% by weight of talc (component C) having an average particle size of 3.8μ were mixed by a supermixer produced by Kawada Seisakusho for 5 minutes, and then kneaded and granulated at 210° C. by an FCM twin screw kneader produced by Kobe Seikosho to obtain a composition. Each of specimens was then formed at a molding temperature of 220° C. by an injection molding machine under a clamping pressure of 100 tons, and used for evaluating performance by the above measurement methods except that the Izod impact test was performed at −40° C. The results obtained are shown in Table 3.

Examples 8 to 12

60% by weight of the same crystalline propylene-ethylene block copolymer (component A) as that used in Example 7, 10% by weight of talc, and 30% by weight of each of the own in Table 1, which were obtained by slightly polymerization conditions for the ethylene-α-olefin copolymer used in Example 7 were mixed, molded and then evaluated by the same method as that employed in Example 7. The results are obtained are shown in Table 3.

Example 13

55% by weight of the same crystalline propylene-ethylene block copolymer as that used in Example 7, 35% by weight of an ethylene-α-olefin copolymer, and 10% by weight of talc were mixed, molded and then evaluated by the same method as that employed in Example 7. The results obtained are shown in Table 3.

Example 14

60% by weight of the same crystalline propylene-ethylene block copolymer as that used in Example 7, 30% by weight of an ethylene-α-olefin copolymer, and 5% by weight of talc were mixed, molded and then evaluated by the same method as that employed in Example 7. The results obtained are shown in Table 3.

Example 15

60% by weight of crystalline propylene-ethylene block copolymer having an MFR of 42 g/10 min., and an ethylene content of 9.5% by weight; 30% by weight of an ethylene-α-olefin copolymer, and 10% by weight of talc were mixed, molded and then evaluated by the same method as that employed in Example 7. The results obtained are shown in Table 3.

Comparative Example 6

90% by weight of the crystalline propylene-ethylene block copolymer as that used in Example 7, and 10% by weight of talc were mixed, molded and then evaluated by the same method as that employed in Example 7. The results obtained are shown in Table 4.

Comparative Example 7

60% by weight of the same crystalline propylene-ethylene block copolymer as that used in Example 7, 10% by weight of talc, and 30% by weight of the copolymer obtained by slightly changing the polymerization conditions for the ethylene-α-olefin copolymer used in Example 7 and having an MFR of 1.4 g/10 min., a density of 0.914 g/cm$^3$, and a 1-hexene content of 10% by weight were mixed, molded and then evaluated by the same method as that employed in Example 7. The results shown in Table 4.

Comparative Example 8

60% by weight of the same crystalline propylene-ethylene block copolymer as that used in Example 7, 10% by weight of talc, and 30% by weight of the copolymer obtained by slightly changing the polymerization conditions for the ethylene-α-olefin copolymer used in Example 7 and having an MFR of 1.4 g/10 min., a density of 0.885 g/cm$^3$, and a 1-butene content of 24% by weight were mixed, molded and then evaluated by the same method as that employed in Example 7. The results shown in Table 4.

Comparative Example 9

60% by weight of the same crystalline propylene-ethylene block copolymer as that used in Example 7, 10% by weight of talc, and 30% by weight of the ethylene-propylene copolymer produced by using a vanadium catalyst were mixed, molded and then evaluated by the same method as that employed in Example 7. The results obtained are shown in Table 4.

Comparative Example 10

60% by weight of crystalline propylene-ethylene block copolymer having an MFR of 200 g/10 min., and an ethylene content of 10% by weight; 30% by weight of the same ethylene-α-olefin copolymer as that used in Example 7, and 10% by weight of talc were mixed, molded and then evaluated by the same method as that employed in Example 7. The results obtained are shown in Table 4.

Comparative Example 11

40% by weight of the same crystalline propylene-ethylene block copolymer as that used in Example 7, 50% by weight of the same ethylene-α-olefin copolymer as that used in Example 7, and 10% by weight of talc were mixed, molded and then evaluated by the same method as that employed in Example 7.

The results obtained are shown in Table 4.

Comparative Example 12

60% by weight of crystalline propylene-ethylene block copolymer having an MFR of 33 g/10 min., and an ethylene content of 27% by weight; 30% by weight of the same ethylene-α-olefin copolymer as that used in Example 7, and 10% by weight of talc were mixed, molded and then evaluated by the same method as that employed in Example 7. The results obtained are shown in Table 4.

TABLE 3

| | Unit | Example 7 | 8 | 9 | 10 | 11 | 12 | 13 | 14 | 15 |
|---|---|---|---|---|---|---|---|---|---|---|
| Component A | | | | | | | | | | |
| MFR (230° C.) | g/10 min | 30 | 30 | 30 | 30 | 30 | 30 | 30 | 30 | 42 |
| Ethylene unit content | wt % | 10 | 10 | 10 | 10 | 10 | 10 | 10 | 10 | 9.5 |
| Multiple-Pulse NMR | | | | | | | | | | |
| Crystalline phase (I) | wt % | 66 | 66 | 66 | 66 | 66 | 66 | 66 | 66 | 63 |
| Intermediate phase (II) | wt % | 26 | 26 | 26 | 26 | 26 | 26 | 26 | 26 | 19 |
| Amorphous phase (III) | wt % | 8 | 8 | 8 | 8 | 8 | 8 | 8 | 8 | 18 |
| (I)/(II) | — | 2.5 | 2.5 | 2.5 | 2.5 | 2.5 | 2.5 | 2.5 | 2.5 | 3.3 |
| Amount | wt % | 60 | 60 | 60 | 60 | 60 | 60 | 55 | 65 | 60 |
| Component B | | | | | | | | | | |
| MFR (190° C.) | g/10 min | 1.4 | 4.0 | 1.4 | 4.0 | 4.5 | 1.4 | 1.4 | 1.4 | 1.4 |
| Density | g/cm$^3$ | 0.856 | 0.885 | 0.863 | 0.885 | 0.874 | 0.885 | 0.856 | 0.856 | 0.856 |
| α-olefin content | wt % | 52 | 24 | 50 | 27 | 30 | 24 | 52 | 52 | 52 |
| Kind of comonomer | | 1-hexene | 1-hexene | 1-hexene | 1-butene | 1-butene | 1-butene | 1-hexene | 1-hexene | 1-hexene |
| Average length of methylene sequence | | 10.1 | 20.0 | 11.5 | 20.0 | 15.9 | 19.5 | 10.1 | 10.1 | 10.1 |
| Kind of catalyst | | M | M | M | M | M | M | M | M | M |
| Amount | wt % | 30 | 30 | 30 | 30 | 30 | 30 | 35 | 30 | 30 |
| Component C | | | | | | | | | | |
| Mean particle size | μm | 3.8 | 3.8 | 3.8 | 3.8 | 3.8 | 3.8 | 3.8 | 3.8 | 3.8 |
| Amount | wt % | 1.0 | 10 | 10 | 10 | 10 | 10 | 10 | 5 | 10 |
| Properties of molded piece | | | | | | | | | | |
| Modulus in flexure (at 23° C.) | kg/cm$^2$ | 12500 | 13700 | 12600 | 13500 | 13300 | 13500 | 12000 | 11000 | 11900 |
| Izod impact strength (at −40° C.) | kg–cm/cm$^2$ | 9.0 | 5.4 | 8.2 | 5.3 | 6.5 | 5.2 | 9.7 | 11.5 | 10.5 |

Component A: Crystalline propylene-ethylene block copolymer
Component B: Ethylene-α-olefin copolymer
Component C: Talc
M: Metallocene catalyst
V: Vanadium catalyst

TABLE 4

| | Unit | Comparative Example 6 | 7 | 8 | 9 | 10 | 11 | 12 |
|---|---|---|---|---|---|---|---|---|
| Component A | | | | | | | | |
| MFR (230° C.) | g/10 min | 30 | 30 | 30 | 30 | 200 | 30 | 33 |
| Ethylene unit content | wt % | 10 | 10 | 10 | 10 | 10 | 10 | 27 |
| Multiple-Pulse NMR | | | | | | | | |
| Crystalline phase (I) | wt % | 66 | 66 | 66 | 66 | 66 | 66 | 59 |
| Intermediate phase (II) | wt % | 26 | 26 | 26 | 26 | 26 | 26 | 16 |
| Amorphous phase (III) | wt % | 8 | 8 | 8 | 8 | 8 | 8 | 25 |
| (I)/(II) | — | 2.5 | 2.5 | 2.5 | 2.5 | 2.5 | 2.5 | 3.7 |
| Amount | wt % | 90 | 60 | 60 | 60 | 60 | 40 | 60 |
| Component B | | | | | | | | |
| MFR (190° C.) | g/10 min | — | 1.4 | 1.4 | 0.3 | 1.4 | 1.4 | 1.4 |
| Density | g/cm$^3$ | — | 0.914 | 0.885 | 0.860 | 0.856 | 0.856 | 0.856 |
| α-olefin content | wt % | — | 10 | 24 | 27 | 52 | 52 | 52 |
| Kind of comonomer | | — | 1-hexene | 1-butene | propylene | 1-hexene | 1-hexene | 1-hexene |
| Average length of methylene sequence | | — | 37.5 | 19.5 | 11.4 | 10.1 | 10.1 | 10.1 |
| Kind of catalyst | | — | M | M | V | M | M | M |
| Amount | wt % | — | 30 | 30 | 30 | 30 | 50 | 30 |
| Component C | | | | | | | | |
| Mean particle size | μm | 3.8 | 3.8 | 3.8 | 3.8 | 3.8 | 3.8 | 3.8 |
| Amount | wt % | 10 | 10 | 10 | 10 | 10 | 10 | 10 |
| Properties of molded piece | | | | | | | | |
| Modulus in flexure (at 23° C.) | kg/cm$^2$ | 38100 | 15600 | 13100 | 12500 | 12400 | 6200 | 11100 |

TABLE 4-continued

| | Unit | Comparative Example | | | | | | |
| --- | --- | --- | --- | --- | --- | --- | --- | --- |
| | | 6 | 7 | 8 | 9 | 10 | 11 | 12 |
| Izod impact strength (at −40° C.) | kg–cm/cm² | 1.5 | 2.3 | 3.8 | 7.8 | 4.2 | not broken | 9.4 |

Component A: Crystalline propylene-ethylene block copolymer
Component B: Ethylene-α-olefin copolymer
Component C: Talc
M: Metallocene catalyst
V: Vanadium catalyst Since the inorganic filler-containing resin composition of the present invention exhibits an excellent balance between low-temperature impact resistance and rigidity, and is suitable for injection molding, the resin composition is advantageous as a material used for automobile exterior trim parts such as bumpers, automobile interior trim parts such as instrument panels, etc.

What is claimed is:

1. A propylene resin composition consisting essentially of the following components A, B and C in weight percentages based on the total weight of Components A, B and C:

Component A: 50 to 80% by weight of a crystalline propylene-ethylene block copolymer having an ethylene unit content of 1 to 15% by weight, and a melt flow rate of 10 to 100 g/10 min, Component B: 5 to 40% by weight of an ethylene-α-olefin copolymer containing 30 to 70% by weight of an α-olefin having 4 to 18 carbon atoms, a melt flow rate of 0.01 to 7 g/10 min., and a density of 0.850 to 0.890 g/cm³, said copolymer being produced by using a metallocene catalyst, Component C: 1 to 30% by weight of talc having an average particle size of 0.1 to 5μ.

2. A resin composition according to claim 1, wherein said component A has a ratio by weight of a crystalline phase (I) to an intermediate phase (II) within the range of 11.2 to 4, and an amorphous phase (III) content of 3 to 30% by weight, these phases being determined by Multiple-Pulse NMR Techniques.

3. A resin composition according to claim 1, wherein said component A has an ethylene unit content of 2 to 10% by weight, and a melt flow rate of 20 to 90 g/10 min.

4. A resin composition according to claim 1, wherein said component B has an α-olefin content of 30 to 65% by weight, a density of 0.855 to 0.880 g/cm³, and a melt flow rate of 0.1 to 5 g/10 min.

* * * * *

UNITED STATES PATENT AND TRADEMARK OFFICE
CERTIFICATE OF CORRECTION

PATENT NO. : 6,087,429
DATED : July 11, 2000
INVENTOR(S) : Koji Yamamoto

Page 1 of 1

It is certified that error appears in the above-identified patent and that said Letters Patent is hereby corrected as shown below:

Title page:
Item [*] the Terminal Disclaimer information is missing. It should read as follows:

-- [45] Date of Patent   * Jul. 11, 2000 --

[*]   This patent is subject to a terminal disclimer.

Signed and Sealed this

Second Day of October, 2001

Attest:

*Nicholas P. Godici*

NICHOLAS P. GODICI
*Attesting Officer*   *Acting Director of the United States Patent and Trademark Office*